Dec. 21, 1943. S. H. SWIFT 2,337,505
CONVERTIBLE PASSENGER CAR AND AMBULANCE
Filed March 22, 1941  2 Sheets-Sheet 1

INVENTOR
STANLEY H. SWIFT
BY George B Willcox
ATTORNEY

Dec. 21, 1943. S. H. SWIFT 2,337,505
CONVERTIBLE PASSENGER CAR AND AMBULANCE
Filed March 22, 1941 2 Sheets-Sheet 2

INVENTOR
STANLEY H. SWIFT
BY
*George B. Willcox*
ATTORNEY

Patented Dec. 21, 1943

2,337,505

UNITED STATES PATENT OFFICE 2,337,505

CONVERTIBLE PASSENGER CAR AND AMBULANCE

Stanley H. Swift, Saginaw, Mich.

Application March 22, 1941, Serial No. 384,715

2 Claims. (Cl. 296—19)

This invention relates to improved means for converting a passenger car into a side loading ambulance more quickly and conveniently than heretofore, and with less shifting or alteration of the car body and seats.

An object of my invention is to provide a cot-supporting structure of the turn-table type adapted to be quickly and easily installed in the space between the conventional front and rear seats, or folded into a compact package for stowing in the luggage compartment of the car.

Another object is to provide a turn-table so arranged that a cot placed on it through the side door can be swung into a position lengthwise of the car and adjacent said door and, above the front and rear seats so as to bring the patient's head abreast of the side window for ventilation, light, and an outdoor view.

Another object is to provide a turn-table so arranged in relation to the conventional car seats that neither the driver's seat nor the rear seat directly behind the driver shall be affected by the presence or the absence of the ambulance equipment. Thus an attendant riding in the rear seat is conveniently located alongside the patient to care for him.

Still further objects appearing later in the specifications relate to new and useful structural features of the turn-table and its foldable supporting stool; to means for quickly fastening the stool to the floor of the car and means for locking the turn-table and stool together as a safeguard against accidents.

The invention comprises the devices herein described and claimed and equivalents thereof.

In the drawings, which are illustrative of a preferred embodiment of my invention, Fig. 1 is a fragmentary right-hand side view of a car of sedan type equipped with left-hand drive showing a cot patient in position for traveling, and illustrating the above mentioned relation of the ambulance apparatus to the front seat, right hand door and the side and rear windows;

Figure 1:
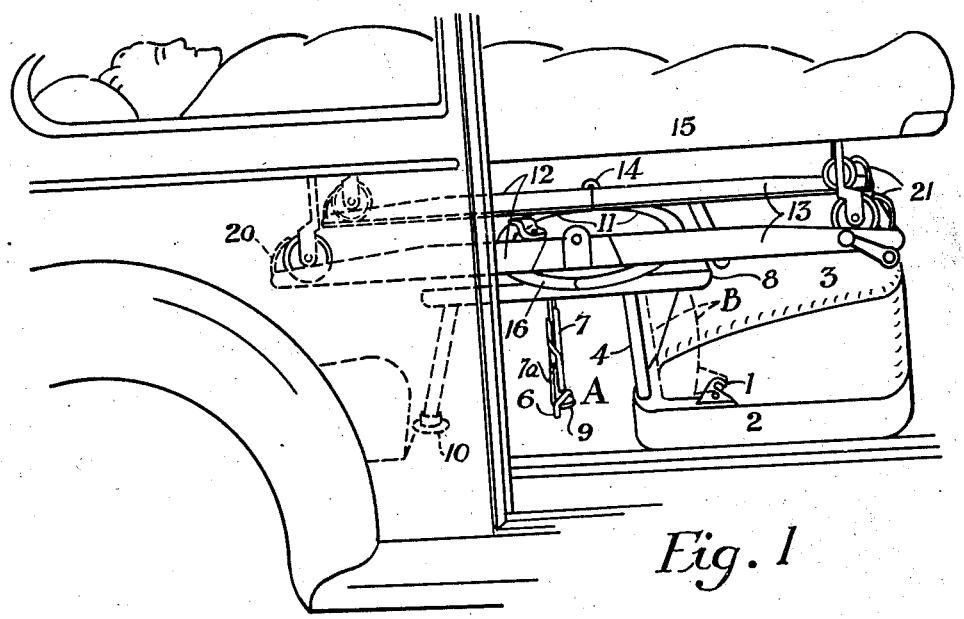

Considering first the general aspects of the device in use, my improvement provides a simple and light yet strong and safe turn-table mechanism adapted to quickly convert a conventional passenger car into an ambulane, Fig. 1. Half a minute is usually sufficient for two patrol officers, upon arriving in their car at the scene of action, to install the ambulance equipment ready to receive a cot patient. They merely lift out the hinged back of the front seat, indicated by dotted lines, Fig. 1, take the folded supporting stool, Fig. 2, from the luggage compartment, unfold and place it in the car as shown in Fig. 3, fastening it to the floor as at A, Fig. 1, in a position between the front and rear seats and abreast the right-hand side doorway. The turn-table, Fig. 4, is then unfolded, placed in the car and pivotally mounted on the stool as in Fig. 5. The patient's cot is then put on the turn-table, which is then swung about its pivot and passes over the right-hand portions of the front and rear seats into position, Fig. 1, close to the right-hand side of the car. Next, the stool and turn-table are fastened together as a rigid unit, as shown in Fig. 6.

Enroute, the attendant occupies the left-hand rear seat directly behind the driver and beside the patient.

About thirty seconds is sufficient to unload the cot, remove the turn-table and the stool, fold and stow them in the luggage compartment and replace the back rest of the right-hand seat. The ambulance is thus reconverted into a passenger sedan. The conversion can be done by one person, instead of two, as is evident from the illustrations, making it useful to physicians in suburban or rural districts where quick transportation of patients is sometimes required. Ordinarily the car gives no indication of being other than a conventional automobile for private use.

Referring now more specifically to details of the device, the right-hand upper part of the front seat indicated by dotted lines in Fig. 1 is removed by lifting the back rest B out of its interlocking engagement with a hook plate 1 which is secured to the base 2 of the seat 3. The back rest can then be stored in the luggage compartment or placed on the car floor in the space forward of front seat 3.

Figure 2:
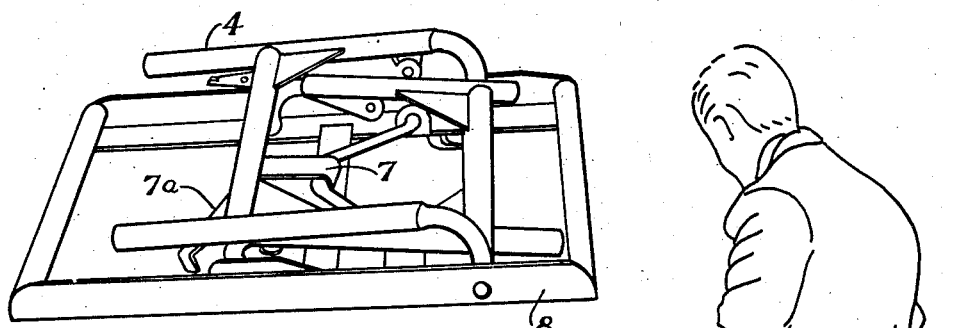
Fig. 2 is a view of the turn-table support or stool, folded.
Figure 3:
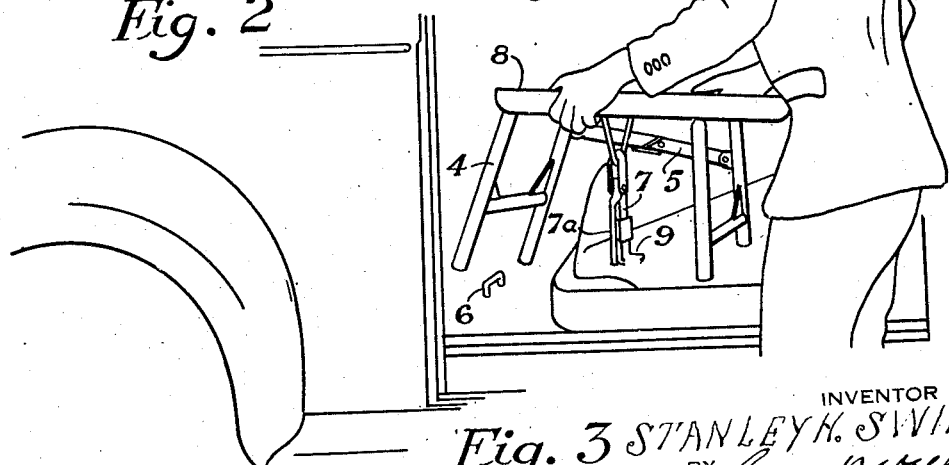
Fig. 3 is a view showing the manner of placing the stool in the car.
Figure 4:
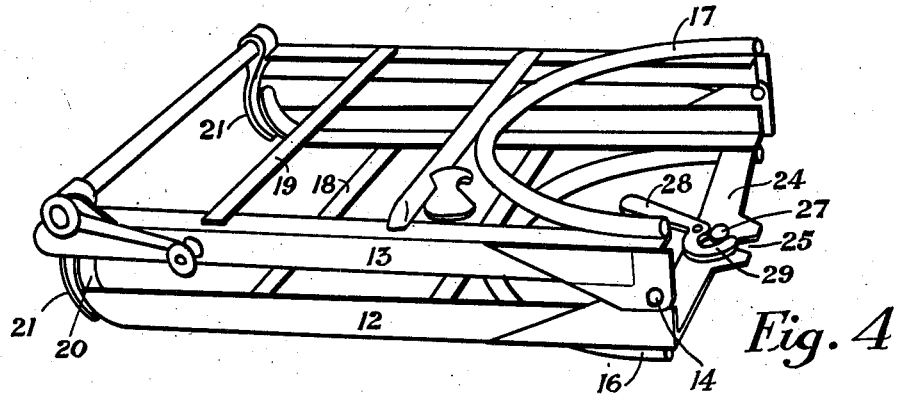
Fig. 4 is a view of the turn-table folded for stowing.

The supporting stool, shown with its legs folded in Fig. 2 and extended in Fig. 3, is unfolded by swinging the hinged legs 4 downward as in an ordinary folding chair or table. The legs are kept in their extended position by means of a connecting bar 5 which itself is preferably jointed and foldable. The stool can be releasably clamped to the floor of the car between the front and rear seats and adjacent the right-hand door, as shown in Fig. 1, by means of a metal eye 6 which is fastened to the floor, and a toggle member 7 which is pivoted to the top frame 8 of the stool. The toggle has a hook 9 at its bottom to engage the eye 6. The toggle 7 is tightened or loosened by means of a pivoted handle 7a. When the handle is raised the hook 9 is freed and when it is down the stool is clamped tightly to the floor. The two rear legs are received in sockets 10 provided on the car floor to prevent the stool from slipping and to assist in quickly alining the stool in proper position. The stool is placed so that the front end of its top frame 8 projects over the front seat 3, as in Fig. 1, so as to afford an adequate bearing surface and support for the turn-table.

The top surface of the stool frame 8 is flat and horizontal when in place, and upon it rests a circular bearing member 11 of a turn-table which will now be described.

The turn-table, shown folded in Fig. 4, is made in two parts, 12, 13 connected at their mid length by hinges 14. When extended these parts present two parallel tracks, shown in Figs. 1 and 6, the tracks being long enough to receive a wheeled cot 15. Each hinged section 12, 13 of the turn-table has fixed to its under side a semi-circular member 16, 17, Fig. 4, preferably made of metal tubing. When the turn-table is unfolded the halves present a complete circular bearing 11, Figs. 1 and 6, that supports and steadies the turn-table on the stool frame 8. Cross-bars 18, 19 connect the two rails of the hinged sections. Upstanding bumpers 20 are formed at the ends of the rails on one hinged section and pivoted arcuate guards 21 are provided at the opposite ends of the rails on the other section, as shown in Fig. 6. The pivoted guards 21 are mounted on a rock-shaft 22 having a crank 23, the handle of the crank having a detent 21 arranged to keep the crank in fixed position when the guards 21 are raised to engage the wheels of a cot on the turn-table, thereby keeping the cot on the turn-table as shown in Fig. 1. When the turn-table is folded as in Fig. 4 the pivoted guards 21 can be turned to lap over and engage the bumpers 20 and thus keep the folded table from opening accidentally. Releasable means is provided for keeping the stool top and the turn-table held down in mutual bearing engagement, although permitting the table to be swung angularly into position.

Figure 5:
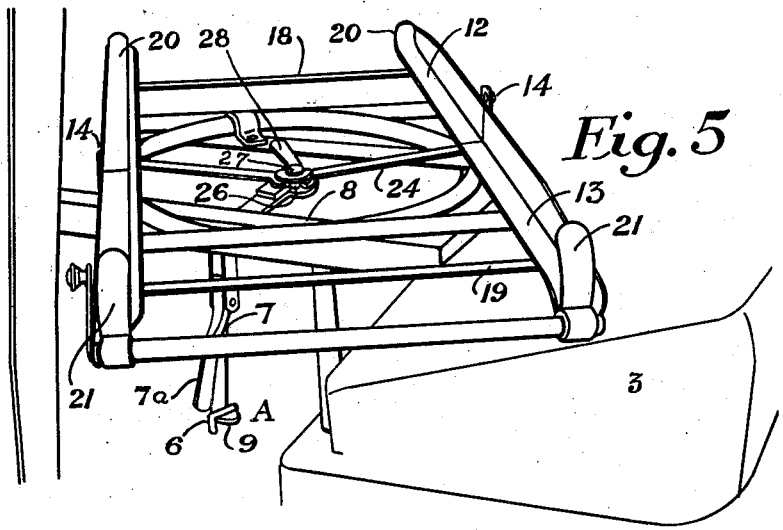
Fig. 5 is a view of the device in position for loading and unloading.
Figure 6:
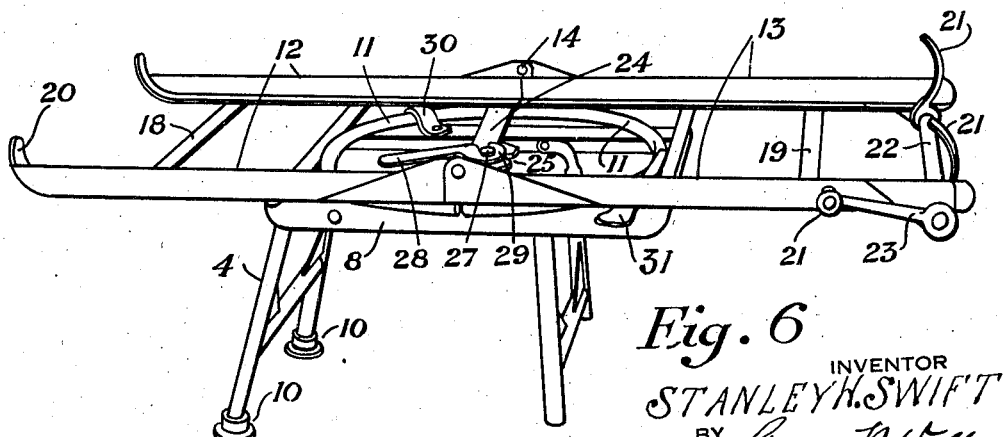
Fig. 6 is a side view of the turn-table and stool, assembled.

A cross bar 24 extends across the turn-table at the middle of its length and is provided with fastening means, such as a slot 25 adapted to receive a pivot pin or pintle 26 which stands upright at the middle of the stool top 8, as shown in Fig. 5. The pivot pin 26 is provided with an enlarged head 27. The cross bar 24, Fig. 6, has pivoted to it, a lever 28 having a hooked end 29 which engages the pivot pin 26 beneath its head 27. By this means the turn-table is fastened to the stool and can not be removed until after the took 29 has been released. The circular bearing member 11 of the turn-table frame rests flatwise on the top of the stool and is slidable on it when the table is rotated on its central pivot 26.

To further assist in preventing the turn-table from coming loose in case the car is accidentally upset, one or more pivoted lugs 30 are secured to the top of the stool and project over the bearing ring 11, as shown in Fig. 6.

Latch means, such as spring detent arm 31, Fig. 6, is secured to one of the sections of the turn-table and engages the stool top, locking the turn-table when it has been swung into position parallel with the doorway in the side of the car. By the several means above described the turn-table is kept from vibrating, rattling, or swinging out of place when the car is on the road.

The legs 4 of the supporting stool may be adjustable in length to adapt the stool to different makes of cars. The turn-table may also be arranged to carry a casket instead of a cot.

When the turn-table is swung inwardly from the loading position, Fig. 5, to the transporting position, Figs. 1 and 6, its front section 13 swings over the cushion of the right-hand front seat, from which the hinged back has been removed. The rear section, 12, of the turn-table swings over the right-hand rear seat. Neither the conventional left front or driver's seat nor the left rear seat are occupied by the ambulance equipment, but both are left free for use as usual.

From the foregoing, it will be apparent that my invention provides an ambulance equipment of the pivotal turn-table type that does not require any of the automobile seats to be removed, but only the back rest of one seat, which can be removed and replaced easily. The improved device has great strength combined with lightness and is relatively inexpensive to manufacture and to install. The fastening devices of the stool and turn-table impart rigidity to the assembled structure and also make the device safer against displacement in case of collision or accident on the road.

Moreover, the patient rides with greater comfort than has been possible with earlier devices where his cot was located near the bottom of the car, or just above the level of the seats, because in my present improvement the patient's cot is higher up, that is to say at about the level of the head and shoulders of a passenger riding in the rear seat, which gives the patient a steadier ride.

Having thus described my invention, what I claim and desire to secure by Letters Patent is:

1. In a convertible vehicle of the class described including a body having a side entrance and non-removable front and rear seats whose bottoms extend across the car from side to side; in combination, the improvement comprising a stretcher turn-table mounted to turn about an axis situated in the usual passageway between the back edge of the front seat bottom and the front edge of the rear seat bottom, the plane of movement of the turn-table being higher than said bottoms; the relative arrangement of the turn-table and seat bottoms being such that an end portion of the turn-table swings freely over the front seat bottom while turning toward said entrance into position for loading and also projects over such bottom when in usual position for traveling; an annular bearing member, of approximately the same width as the turn-table, fixed to the under side of the turn-table substantially at the mid-length thereof, its axis coinciding with the axis of the turn-table; a stool having foldable legs and a top frame, comprising spaced bars, a portion of the length of each bar being slidingly engaged by a corresponding portion of the rim of the said annular bearing members; such engagements of the bearing member with the bars comprising guide means to stabilize the turn-table in all positions; and means for keeping the bearing member in place on the stool under the conditions of use of the vehicle.

2. A device for converting an automobile into an ambulance but permitting ready reconversion to the usual passenger-carrying arrangement comprising; a front seat nearest the loading and unloading door having a detachable back rest; a turn-table mounted to turn about an axis situated in the usual passageway between the back edge of the front seat bottom and the front edge of the rear seat bottom, the plane of movement of such turn-table being higher than said seat bottoms; the relative arrangement of the turn-table and the seat bottoms being such than an end portion of the turn-table swings freely over the front seat bottom while turning toward said entrance into position for loading, and also projects over such bottom when in the usual position for traveling; a foldable support having a horizontal top frame comprising spaced bars; said turn-table being provided with an annular bearing member rotatably supported by said bars and providing a guide means to stabilize the turn-table in all rotated positions; and means for keeping the bearing member in place on the bars bars under the conditions of use of the vehicle, yet readily releasing the same to permit rapid dismantling of the device for reconversion.

STANLEY H. SWIFT.